(12) United States Patent
Kim et al.

(10) Patent No.: US 11,076,031 B2
(45) Date of Patent: Jul. 27, 2021

(54) ELECTRONIC DEVICE FOR PROVIDING DIFFERENT SERVICES ACCORDING TO EXTERNAL DEVICE

(71) Applicant: Samsung Electronics Co., Ltd., Gyeonggi-do (KR)

(72) Inventors: Wonbum Kim, Gyeonggi-do (KR); Kwanghyung Lee, Gyeonggi-do (KR); Hyunjung Byun, Gyeonggi-do (KR); Sungoh Hwang, Gyeonggi-do (KR); Gajin Song, Gyeonggi-do (KR); Dongho Jang, Gyeonggi-do (KR); Yongjoon Jeon, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/765,768

(22) PCT Filed: Dec. 10, 2018

(86) PCT No.: PCT/KR2018/015604
§ 371 (c)(1),
(2) Date: May 20, 2020

(87) PCT Pub. No.: WO2019/117561
PCT Pub. Date: Jun. 20, 2019

(65) Prior Publication Data
US 2020/0296193 A1    Sep. 17, 2020

(30) Foreign Application Priority Data
Dec. 11, 2017 (KR) .................. 10-2017-0169037

(51) Int. Cl.
*H04M 1/02* (2006.01)
*H04M 1/72409* (2021.01)
*H04M 1/72469* (2021.01)

(52) U.S. Cl.
CPC ..... *H04M 1/0274* (2013.01); *H04M 1/72409* (2021.01); *H04M 1/72469* (2021.01);
(Continued)

(58) Field of Classification Search
CPC .................................................. H04M 1/0274
See application file for complete search history.

(56) References Cited

U.S. PATENT DOCUMENTS

| 8,731,614 B2 | 5/2014 | Kim et al. |
| 9,241,062 B2 | 1/2016 | Khalid et al. |

(Continued)

FOREIGN PATENT DOCUMENTS

| JP | 6142008 | 6/2017 |
| KR | 20020024951 | 4/2002 |

(Continued)

OTHER PUBLICATIONS

PCT/ISA/210 Search Report issued on PCT/KR2018/015604, pp. 5.
PCT/ISA/237 Written Opinion issued on PCT/KR2018/015604, pp. 4.

*Primary Examiner* — Hsinchun Liao
(74) *Attorney, Agent, or Firm* — The Farrell Law Firm, P.C.

(57) ABSTRACT

An electronic device according to an embodiment includes a processor and a memory, and the memory stores instructions which when executed, cause the processor to, in a first operation when the electronic device is connected to a first external accessory device via the electrical connector, receive at least one first identification (ID) from the first external accessory device via the electrical connector, render a first screen including a first plurality of icons for application programs on the memory based at least in part on the first ID, and provide data associated with the first screen to an external display through the first external accessory device via the electrical connector and in a second operation (Continued)

when the electronic device is connected to a second external accessory device via the electrical connector, receive at least one second ID from the second external accessory device via the electrical connector, the second ID being of the same type as the first ID, receive at least one third ID from the second external accessory device via the electrical connector, the third ID being of a different type from the first ID, render a second screen including a second plurality of icons for the application programs on the memory based at least in part on the third ID, and provide data associated with the second screen to the external display device through the second external accessory device via the electrical connector.

15 Claims, 15 Drawing Sheets

(52) U.S. Cl.
CPC .... *H04M 2201/34* (2013.01); *H04M 2201/36* (2013.01); *H04M 2250/22* (2013.01)

(56) References Cited

U.S. PATENT DOCUMENTS

| | | |
|---|---|---|
| 9,503,565 B2 | 11/2016 | Kim et al. |
| 10,032,431 B2 | 7/2018 | Wilde et al. |
| 2008/0214239 A1 | 9/2008 | Hashimoto et al. |
| 2009/0178097 A1* | 7/2009 | Kim .................... G06F 13/4072 |
| | | 725/114 |
| 2013/0249843 A1* | 9/2013 | Yano ................ H04M 1/72469 |
| | | 345/173 |
| 2016/0148270 A1 | 5/2016 | Vigier et al. |
| 2016/0196048 A1 | 7/2016 | Khoury et al. |
| 2017/0099565 A1* | 4/2017 | Sato ...................... H04W 76/11 |
| 2018/0349001 A1 | 12/2018 | Khoury et al. |
| 2019/0027111 A1 | 1/2019 | Wilde et al. |

FOREIGN PATENT DOCUMENTS

| | | |
|---|---|---|
| KR | 100810881 | 3/2008 |
| KR | 101782649 | 9/2017 |

* cited by examiner

ELECTRONIC DEVICE FOR PROVIDING DIFFERENT SERVICES ACCORDING TO EXTERNAL DEVICE

PRIORITY

This application is a National Phase Entry of PCT International Application No. PCT/KR2018/015604 which was filed on Dec. 10, 2018, and claims priority to Korean Patent Application No. 10-2017-0169037, which was filed on Dec. 11, 2017, the content of each of which is incorporated herein by reference.

TECHNICAL FIELD

Embodiments disclosed herein relate to a technology for providing different services according to external devices

BACKGROUND ART

A mobile electronic device, such as a smartphone, a tablet PC or a wearable device, has been used increasingly. The electronic device may perform various functions such as a call, wireless communication, video playback, and web search. The electronic device may be used independently or may be used in a status of being connected to an external display device (e.g., a monitor or a TV). For example, the electronic device may be connected to a monitor or a TV wiredly or wirelessly and output content (e.g., image or text) of the electronic device to an external display device.

DISCLOSURE

Technical Problem

A technology for displaying a screen of a mobile electronic device on an external display device connected to the mobile electronic device has been developed because the mobile electronic device has a disadvantage of having a small display area. In this case, when a screen of the mobile electronic device is displayed on the external display device as it is, the usability thereof decreases and the mobile electronic device needs to change the size, resolution, and/or density of the screen or the like and reconfigure a user interface (UI). The mobile electronic device may display a reconstructed UI on the external display device through the external accessory device.

Such an external accessory device may be installed in various public places as needed, but there is a problem that it is impossible to provide a service suitable for an installation place to a user because a UI screen configured by the mobile electronic device complies with settings of the user's mobile electronic device.

Embodiments disclosed in the disclosure may provide an electronic device that provides a customized service according to an external accessory device connected to the electronic device.

Technical Solution

According to an embodiment disclosed herein, an electronic device includes a housing, a touch screen display exposed through the housing, an electrical connector exposed through the housing, a wireless communication circuit, a processor operatively connected to the display, the electrical connector and the communication circuit, and a memory operatively connected to the processor, wherein the memory stores instructions which when executed, cause the processor to, in a first operation when the electronic device is connected to a first external accessory device via the electrical connector, receive at least one first identification (ID) from the first external accessory device via the electrical connector, render a first screen including a first plurality of icons for application programs on the memory based at least in part on the first ID, and provide data associated with the first screen to an external display through the first external accessory device via the electrical connector and in a second operation when the electronic device is connected to a second external accessory device via the electrical connector, receive at least one second ID from the second external accessory device via the electrical connector, the second ID being of the same type as the first ID, receive at least one third ID from the second external accessory device via the electrical connector, the third II) being of a different type from the first ID, render a second screen including a second plurality of icons for the application programs on the memory based at least in part on the third II), and provide data associated with the second screen to the external display device through the second external accessory device via the electrical connector.

According to an embodiment disclosed herein, an electronic device includes a housing, a touch screen display exposed through the housing, an electrical connector exposed through the housing, a wireless communication circuit, a processor operatively connected to the display, the electrical connector and the communication circuit, and a memory operatively connected to the processor, wherein the memory stores instructions which when executed, cause the processor to, in a first operation when the electronic device is connected to a first external accessory device via the electrical connector, receive at least one first ID from the first external accessory device via the electrical connector, render a first screen including a first plurality of icons for application programs on the memory, and provide data associated with the first screen to an external display through the first external accessory device via the electrical connector, and in a second operation when the electronic device is connected to a second external accessory device via the electrical connector, receive at least one second ID from the second external accessory device via the electrical connector, the second ID being of the same type as the first ID, determine a status of the electronic device, render a second screen including a second plurality of icons for application programs on the memory based at least in part on the status, and provide data associated with the second screen to the external display device through the second external accessory device via the electrical connector.

Advantageous Effects

According to the embodiments disclosed herein, the electronic device may provide a customized desktop mode service according to a connected external accessory device.

According to embodiments disclosed herein, the electronic device may provide various desktop mode services to a user.

In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
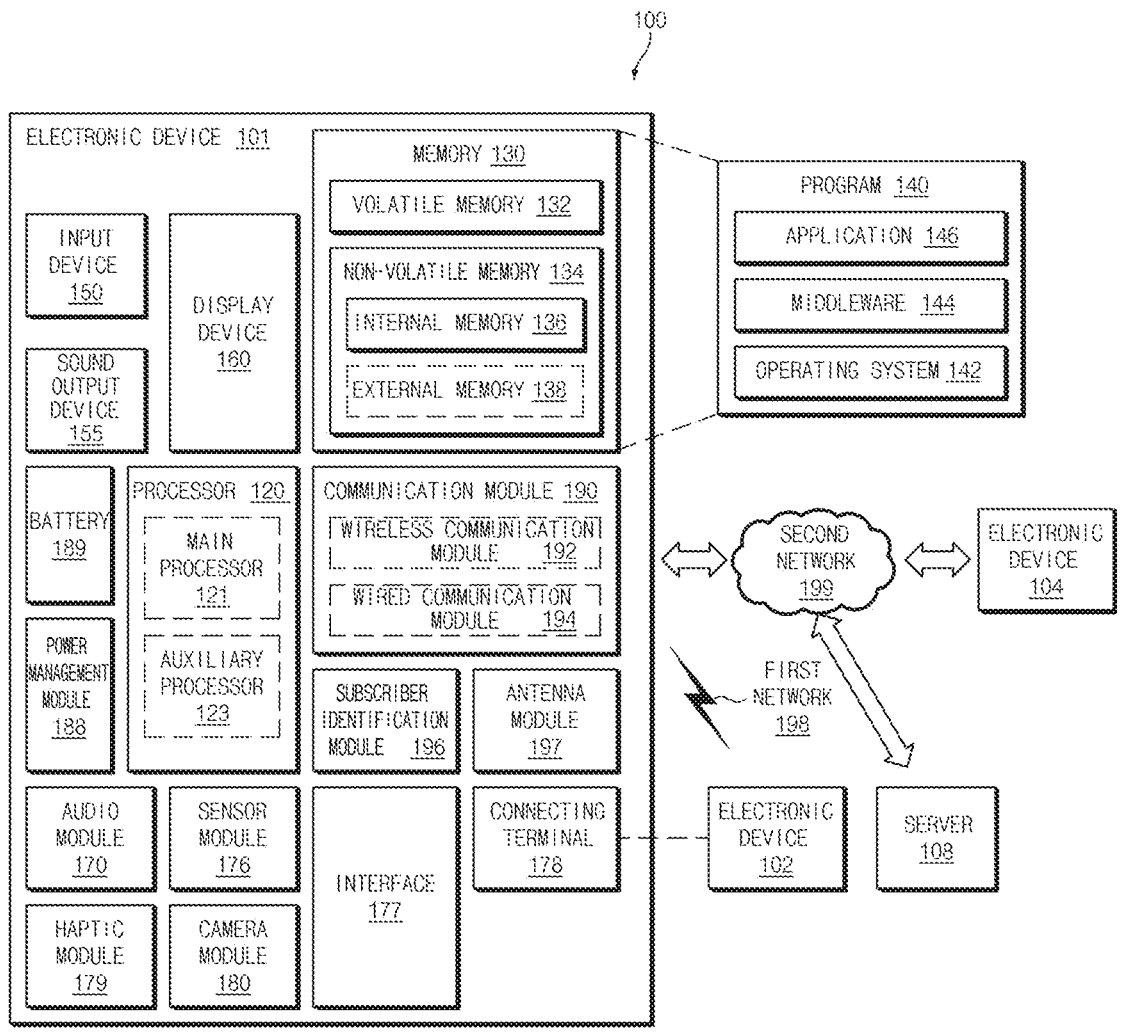
FIG. 1 is a block diagram illustrating an electronic device 101 in a network environment 100 according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (WPM.

According to an embodiment, commands or data may be transmitted or received between the electronic device 101 and the external electronic device 104 via the server 108 coupled with the second network 199. Each of the electronic devices 102 and 104 may be a same type of device as or a different type of device from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
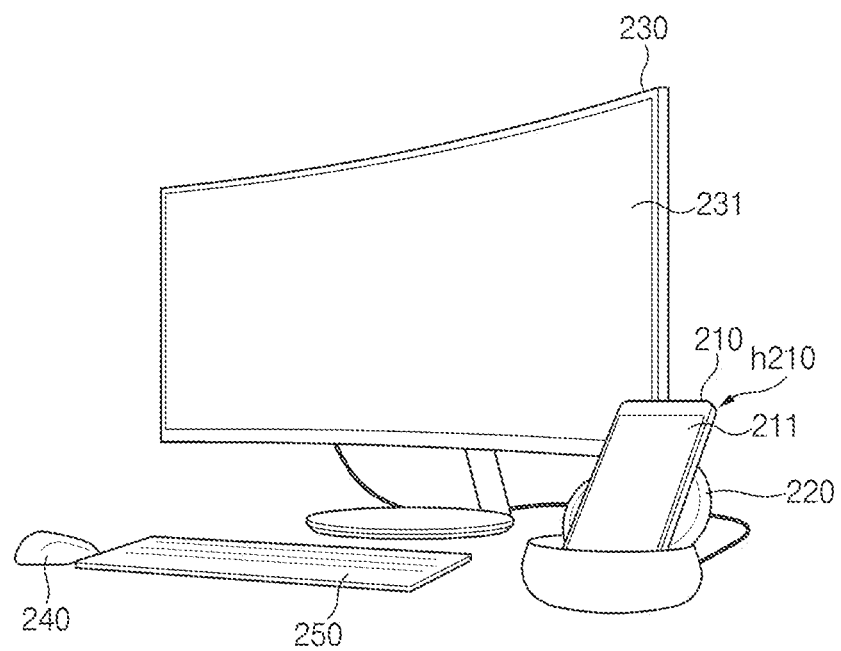
FIG. 2 illustrates an operation environment of an electronic device according to an embodiment.

FIG. 2 illustrates an operation environment of an electronic device according to an embodiment.

Referring to FIG. 2, an electronic device 210 (e.g., the electronic device 100 of FIG. 1) may be connected to an intermediary device 220 (e.g., the electronic device 102 of FIG. 1) and an external display device 230. The electronic device 210 may be a mobile device including a display 211 (e.g., the display device 160 of FIG. 1) of which the size is relatively smaller than that of the external display device 230. The electronic device 210 may be, for example, a smartphone, a tablet PC, or a wearable device.

According to various embodiments, the display 211 of the electronic device 210 may include a touch panel (or touch sensor) therein. The display 211 may receive a user's touch input. The touch input of the user detected through the display 211 may be converted into an electrical signal and transferred to a processor in the electronic device 210. According to various embodiments, the display 211 of the electronic device 210 may include a pressure sensor therein. The pressure sensor may detect the strength of a pressure on the display 211 by the user. The pressure sensor may convert the user's input into an electrical signal according to the strength of the pressure, and transfer the electrical signal to the processor in the electronic device 210.

According to various embodiments, at least a portion of the display 211 may operate as an input device (e.g., a touch pad) according to a specified condition (e.g., whether the external display device 230 is connected or an external pointing device 240 is connected). For example, when the display 211 operates as a touch pad, the user's touch input may be applied to the movement or click operation of a mouse pointer or cursor that is output on a screen of the external display device 230.

The intermediary device 220 may connect the electronic device 210 and the external display device 230. The intermediary device 220 may be, for example, a dock (or a docking station). The intermediary device 220 may include a stand portion in which the electronic device 210 is seated.

In FIG. 2, the electronic device 210 is mounted on the intermediary device 220 in a portrait mode by way of example, but is not limited thereto. For example, the electronic device 210 may be mounted on the intermediary device 220 in a landscape mode. The intermediary device 220 may be connected to the electronic device 210 through an input/output interface such as, for example, a USB port.

According to various embodiments, the intermediary device 220 may include a port for wired connection with an external input device (e.g., the pointing device 240 or a keyboard device 250). When an external input device is connected to the port, connection information with the external input device may be provided to the electronic device 210.

The external display device 230 may be a device (e.g., a monitor or a TV) that outputs content provided by the electronic device 210. The external display device 230 may output (e.g., mirroring) the same screen as the display 211 of the electronic device 210 or may output a screen at least in part different from the display 211.

The external display device 230 may be connected to the electronic device 210 through the intermediary device 220.

According to various embodiments, when the electronic device 210 is connected to (or is able to communicate with) the external display device 230, the electronic device 210 may output content (e.g., an image, text, an icon, or the like) through the external display device 230. The electronic device 210 may reconstruct at least a part of the content displayed on the display 211, and output the reconstructed screen through the external display device 230. For example, the electronic device 210 may output a user interface similar to that in the case of using a desktop PC through a display 231 of the external display device 230.

The electronic device 210 may be wiredly or wirelessly connected to an external input device such as the external pointing device (e.g., a mouse or a touch pad) 240 or the external keyboard device (e.g., a keyboard) 250. The electronic device 210 may receive a user input through the external pointing device 240 or the external keyboard device 250. The user may control the content output through the electronic device 210 or the external display device 230 using the external pointing device 240 or the external keyboard device 250.

Figure 3:
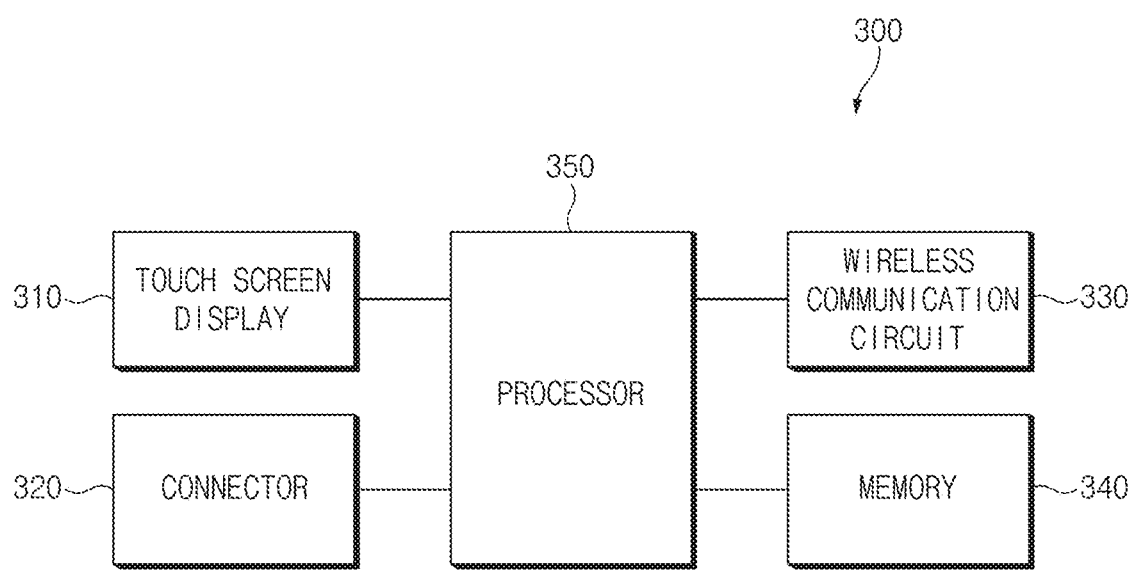
FIG. 3 is a block diagram of an electronic device according to an embodiment.

FIG. 3 is a block diagram of an electronic device according to an embodiment.

Referring to FIG. 3, an electronic device 300 (e.g., the electronic device 100 of FIG. 1 or the electronic device 210 of FIG. 2) may include a housing (e.g., the housing h210 of FIG. 2) and a touch screen display 310 (e.g., the display device 160 of FIG. 1 or the display 211 of FIG. 2), an electrical connector 320 (e.g., the connecting terminal 178 of FIG. 1), a wireless communication circuit 330 (e.g., the communication module 190 of FIG. 1), a memory 340 (e.g., the memory 130 of FIG. 1), and a processor 350 (e.g., the processor 120 of FIG. 1).

The housing h210 may be s a frame capable of accommodating the components 310-350 of the electronic device 300.

The touch screen display 310 may output an execution screen of an application or the like. In one embodiment, the display 310 may be implemented along with a touch panel (e.g., a touch screen display). According to one embodiment, the touch screen display 310 may be exposed through the housing ( ).

The electrical connector 320 may be a connection port for connecting the electronic device 300 to an intermediary device. The electrical connector 320 may be, for example, a USB-C type connector, a micro 5-pin connector, a lightning electrical connector, or the like.

The wireless communication circuit 330 may allow the electronic device 300 to communicate wirelessly with an external server or an external device.

The memory 340 is electrically connected to the processor 350 and may store instructions to be executed by the processor 350. According to one embodiment, the memory 340 may store applications to be executed by the processor 350, resources for providing a service through the external display 310, and the like. According to one embodiment, the memory 340 may store a plurality of sets of service settings.

The processor 350 (e.g., the processor 120) may execute instructions stored in the memory 340 to perform operations to be described below.

Figure 4:
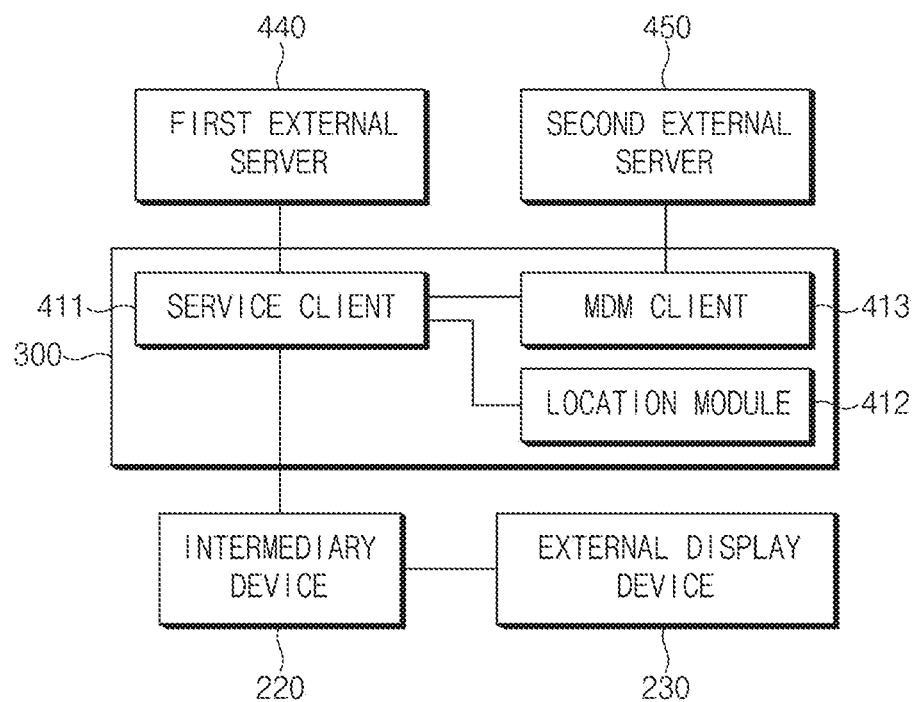
FIG. 4 is a diagram illustrating a connection environment between a software module of an electronic device and external devices according to an embodiment.

FIG. 4 is a diagram illustrating a connection environment between a software module of an electronic device and external devices according to an embodiment.

Referring to FIG. 4, the electronic device 300 (e.g., the electronic device 300 of FIG. 3) may include a service client 411, a location module 412, and a mobile device management (MDM) client 413. In the following description, it may be understood that an operation of each software module is performed by the processor 350.

The service client 411 may include a plurality of sets of service settings. According to one embodiment, the sets of service settings may be stored in the form of at least one format file among JSON, XML, or HTML. According to one embodiment, each set of service settings may include an identification (ID) of at least one intermediary device 220 (e.g., the intermediary device 220 of FIG. 2) or an ID corresponding to the ID of the intermediary device 220. According to one embodiment, the ID of the intermediary device 220 may be a mac address of the intermediary device 220 or a unique ID. According to one embodiment, each set of service settings may include location information.

According to one embodiment, the set of service settings may include at least one setting value or the like among an activation/deactivation hardware setting value for hardware (e.g., USB/HDMI/Ethernet) of the electronic device 300, a screen auto-off time setting value, a customized home screen/lock screen/Wallpaper setting value, a lock type setting value, a container mode setting value in a mobile device management (MDM) mode, an allowed/disallowed application setting value or a communication setting value (e.g. Ethernet/office Wi-Fi/cellular data).

According to an embodiment, when the electronic device 300 is connected to the intermediary device 220, the service client 411 may receive an ID of the intermediary device 220 from the intermediary device 220. The service client 411 may provide a desktop mode service (Dex, Desktop experience service) based on a set of service settings corresponding to the ID of the received intermediary device 220 among the plurality of sets of service settings included in the service client 411. According to an embodiment, the desktop mode service may provide a user interface (UI) or user experience (UX) similar to a UI or a UX provided by a desktop to the external display device 230. For example, the service client 411 may include transmitting data related to a screen including icons for application programs that are allowable according to settings included in a set of desktop mode service settings to the external display device 230 (e.g., the external display device 230 of FIG. 2) through the intermediary device 220.

According to an embodiment, a first external server 440 may include a plurality of sets of service settings respectively corresponding to IDs of at least one intermediary device 220. According to an embodiment, when the service client 411 does not include a set of service settings corresponding to the received ID of the intermediary device 220, the service client 411 may transmit the received ID of the intermediary device 220 to the first external server 440. The first external server 440 may transmit the set of service settings corresponding to the received ID) of the intermediary device 220 to the service client 411. The service client 411 may provide a desktop mode service based on the set of service settings received from the first external server 440.

The location module 412 may obtain location information of the electronic device 300. According to an embodiment, the location module 412 may obtain location information using GPS, Wi-Fi, cellular data, or the like. According to an embodiment, the service client 411 may receive location information from the location module 412 and provide the desktop mode service based on a set of service settings corresponding to a location of the electronic device 300.

The MDM client 413 may be installed in the electronic device 300 in the form of an application. The MDM client 413 may restrict operations of various modules included in the electronic device 300 by executing an MDM mode according to whether the electronic device 300 is located within a predetermined area. The MUM mode may be, for example, a mode for at least one of protection (e.g., password setting), management (e.g., function control or device initialization), and monitoring of the electronic device 330.

According to an embodiment, when the MDM client 413 executes the MDM mode, an operation of a camera module, a Wi-Fi module, a Bluetooth module, a mobile access point module, a USB port, a memory, or the like may be restricted according to a predefined MDM setting.

According to an embodiment, the MDM client 413 may include a plurality of sets of service settings necessary for the service client 411 to provide the desktop mode service when the MDM mode is executed. According to an embodiment, the MDM client 413 may receive one or more sets of service settings when the MUM mode is executed by a second external server 450. According to one embodiment, the second external server 450 may be an MDM server.

According to an embodiment, each set of service settings included in the MDM client 413 may correspond to at least one intermediary device 220 ID. According to an embodiment, each set of service settings may correspond to a location area.

According to an embodiment, when the MDM mode is executed, the service client 411 may receive a set of service settings from the MDM client 413 and provide a desktop mode service based on the received set of service settings.

In the following, a set of service settings will be described.

According to an embodiment, a set of service settings may include resources necessary for the processor 350 to render a screen of the electronic device 300. According to an embodiment, the set of service settings may include a plurality of setting values. For example, the hardware activation/deactivation setting value of the electronic device 300 may be a setting value indicating whether to activate hardware, such as a camera module, a Wi-Fi module, a Bluetooth module, a mobile access point module, a USB port, or the memory 340. The screen auto-off time setting value may be a setting value for turning off the screen of the display 310 when a user input is not received for a predetermined time. The customized home screen/lock screen/wallpaper setting value may be a setting value for an image to be displayed on the home screen, the lock screen, or the wallpaper. The lock type setting value may be a setting value for a lock type to be used to unlock the electronic device 300 on the lock screen. The container mode setting value in the MDM mode may be a setting value of whether to allow execution of only application programs stored in a secure area when the electronic device 300 is in the MDM mode. The allowed/disallowed application setting value may be a setting value for an application program to be allowed for execution and an application program not to be allowed for execution among application programs stored in the electronic device. The communication setting value may be a setting value for a communication method (e.g., Bluetooth, Wi-Fi, or cellular communication) to be allowed.

According to an embodiment, the set of service settings may include an II) of at least one intermediary device or an ID corresponding to the ID of the intermediary device. According to an embodiment, the processor 350 of the electronic device 300 may provide a desktop mode service based on a set of service settings including an ID of an intermediary device connected to the electronic device among a plurality of sets of service settings.

For example, the electronic device may include first to fifth application programs, and may include a communication module capable of using Bluetooth communication, Wi-Fi communication, and cellular communication. The memory 340 of the electronic device 300 may store a first set of service settings and a second set of service settings. In an embodiment, the first set of service settings may include an allowed/disallowed application setting value allowing only first to third application programs and a communication setting value allowing only cellular communication, and may include 001 which is an ID of an intermediary device. The second set of service settings may include an allowed/disallowed application setting value allowing only third and fourth application programs and a communication setting value allowing only Wi-Fi communication, and may include 002 which is an ID of an intermediary device. In this case, when the electronic device 300 is connected to an intermediary device having an ID of 001, the processor 350 may allow execution of only the first to third application programs and activate only cellular communication based on the first set of service settings including 001 that is the ID of the intermediary device. The processor 350 may render a screen including a plurality of icons for the first to third application programs, and transmit data associated with the rendered screen to an external display device through the intermediary device. The allowed/disallowed application setting value may be used by the processor 350 as resources for rendering a screen including an icon for an allowed application program.

According to an embodiment, the set of service settings may be a set of service settings for the MDM mode. According to an embodiment, when the electronic device 300 operates in the mode, the processor 350 may provide a desktop mode service based on the set of service settings for the MDM mode.

Hereinafter, a method of generating a set of service settings by a user will be described.

Figure 5A:
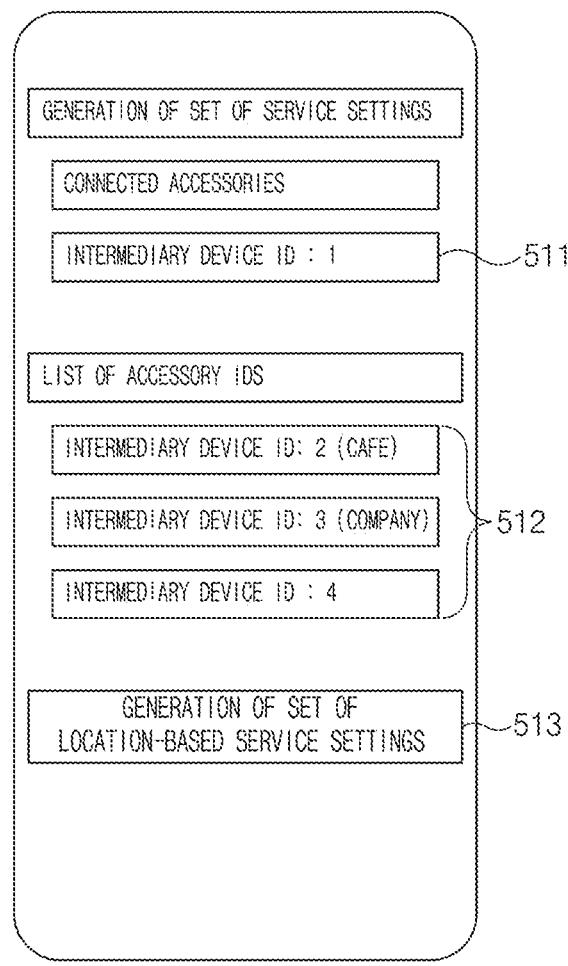
FIG. 5A illustrates a screen showing a list of sets of service settings stored in an electronic device according to an embodiment.
Figure 5B:
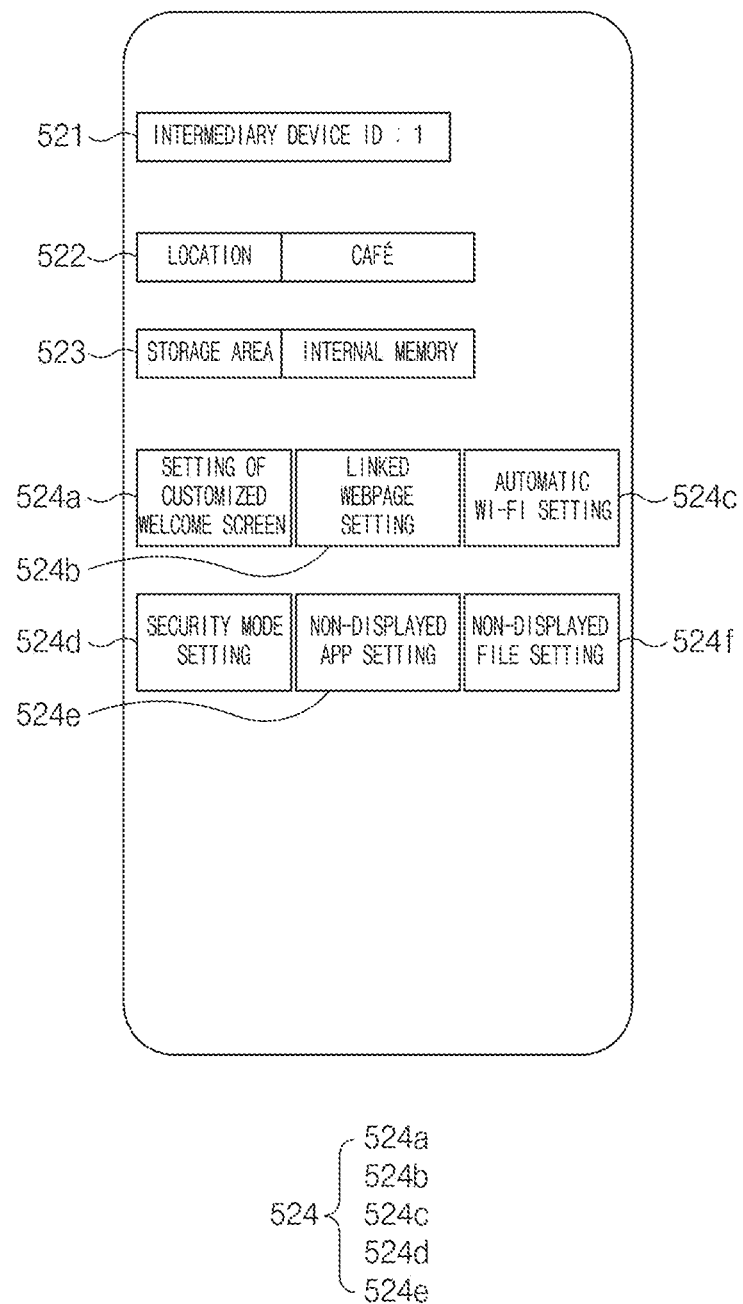
FIG. 5B illustrates a for generating a set of service settings corresponding to an ID of a selected intermediary device according to an embodiment.

FIG. 5A illustrates a screen showing a list of sets of service settings stored in an electronic device according to an embodiment. FIG. 5B illustrates a UI for generating a set of service settings corresponding to an ID of a selected intermediary device according to an embodiment.

According to an embodiment, when the electronic device 300 is connected to an intermediary device, the electronic device may receive an ID of the intermediary device. When the memory 340 of the electronic device does not store a set of service settings corresponding to the received ID of the intermediary device, the processor 350 may execute a mode for generating a set of service settings. According to an embodiment, when the processor 350 transmits the ID of the intermediary device to an external server and receives a response indicating that the external server does not store the set of service settings corresponding to the ID of the intermediary device, the processor 350 may execute the mode for generating a set of service settings.

According to various embodiments, even when the memory 340 of the electronic device 300 or the external server stores the set of service settings corresponding to the received ID of the intermediary device, the processor 350 may execute the mode for generating a set of service settings.

According to an embodiment, when the processor 350 executes the mode for generating a set of service settings, as shown in FIG. 5A, the processor 350 may display an ID 511 of an intermediary device connected to the electronic device 300, a list 512 of IDs of intermediary devices corresponding to sets of service settings stored in the electronic device 300, and an object 513 for generating a set of location-based service settings.

According to an embodiment, when a user input for selecting the ID 511 of the intermediary device connected to the electronic device 300 is received, as shown in FIG. 5B, the processor 350 may display a UI for generating a set of service settings corresponding to the ID of the connected intermediary device on the touch screen display 310.

According to an embodiment, the UI for generating a set of service settings may include an ID 521 of an intermediary device, a location 522 of the intermediary device, storage 523 in which a set of service settings is stored, and a list of setting targets 524.

According to an embodiment, the storage in which the set of service settings is stored may be the memory 340 of the electronic device 300, an external server, or the like.

According to an embodiment, the list of setting targets may include a customized welcome screen setting object 524a, a linked webpage setting object 524b, an automatic Wi-Fi setting object 524c, a security mode setting object 524d, a non-displayed application setting object 524e and a non-displayed file setting object 524f.

When the customized welcome screen setting object 524a is selected, the processor 350 may display a screen for setting a welcome screen to be displayed when the intermediary device is connected. When the linked web page setting object 524b is selected, the processor 350 may display a screen for setting a web page that is first opened when an internet browser is executed. When the automatic Wi-Fi setting object 524c is selected, the processor 350 may display a screen for setting a service set identifier (SSID) and a password of an access point (AP) for automatic Wi-Fi access. When the security mode setting object 524d is selected, the processor 350 may display a screen for setting whether the set of service settings is usable in the security mode. When the non-displayed application setting object 524e is selected, the processor 350 may display a screen for setting an application not to be displayed when the intermediary device is connected. When the non-displayed file setting object 524f is selected, the processor 350 may display a screen for setting a file not to be displayed when the intermediary device is connected.

According to an embodiment, after a set of service settings is generated, when an intermediary device corresponding to an ID of the intermediary device included in the set of service settings is connected to the electronic device, the processor 350 may provide a desktop mode service based on the generated set of service settings.

According to various embodiments, the set of service settings stored in an external server may be generated through an external device (e.g., a PC) capable of communicating with the external server.

According to various embodiments, IDs of a plurality of intermediary devices may be registered in one set of service settings. According to an embodiment, the set of service settings may include 0100 to 0150 that are the IDs of the intermediary devices. When an intermediary device having one of 0100 to 0150 as an ID is connected to the electronic device, the processor 350 may receive an ID of the intermediary device and provide a desktop mode service based on the set of service settings.

According to various embodiments, location information may be registered upon generation of the set of service settings. The location information may be registered instead of the ID of the intermediary device or as additional information to the ID of the intermediary device. For example, when the location information is registered instead of the ID of the intermediary device and the intermediary device is connected to the electronic device, the processor 350 may provide the desktop mode service based on the set of service settings corresponding to the location information of the electronic device 300. As another example, when the location information is registered in addition to the ID of the intermediary device and the intermediary device is connected to the electronic device, the electronic device may provide the desktop mode service based on a set of service settings corresponding to both the ID of the connected intermediary device and the location information of the electronic device 300.

According to various embodiments, whether the electronic device 300 supports an input mode using a pen accessory may be registered upon generation of a set of service settings. For example, the set of service settings may be generated to be used when the electronic device 300 supports the pen accessory input mode. The set of service settings may be used only when the electronic device 300 supporting the pen accessory input mode is connected to the intermediary device.

Hereinafter, a method for providing a desktop mode service based on a set of service setting after the electronic device 300 of the disclosure is connected to an intermediary device will be described.

Hereinafter, it is assumed that the electronic device 300 of FIG. 3 performs the process of FIGS. 6 to 11. Operations described as being performed by the electronic device 300 may be implemented by instructions that are performable (or executable) by the processor 350 of the electronic device 300. The instructions may be stored in, for example, a computer recording medium or the memory 340 of the electronic device 300 shown in FIG. 3.

Figure 6:
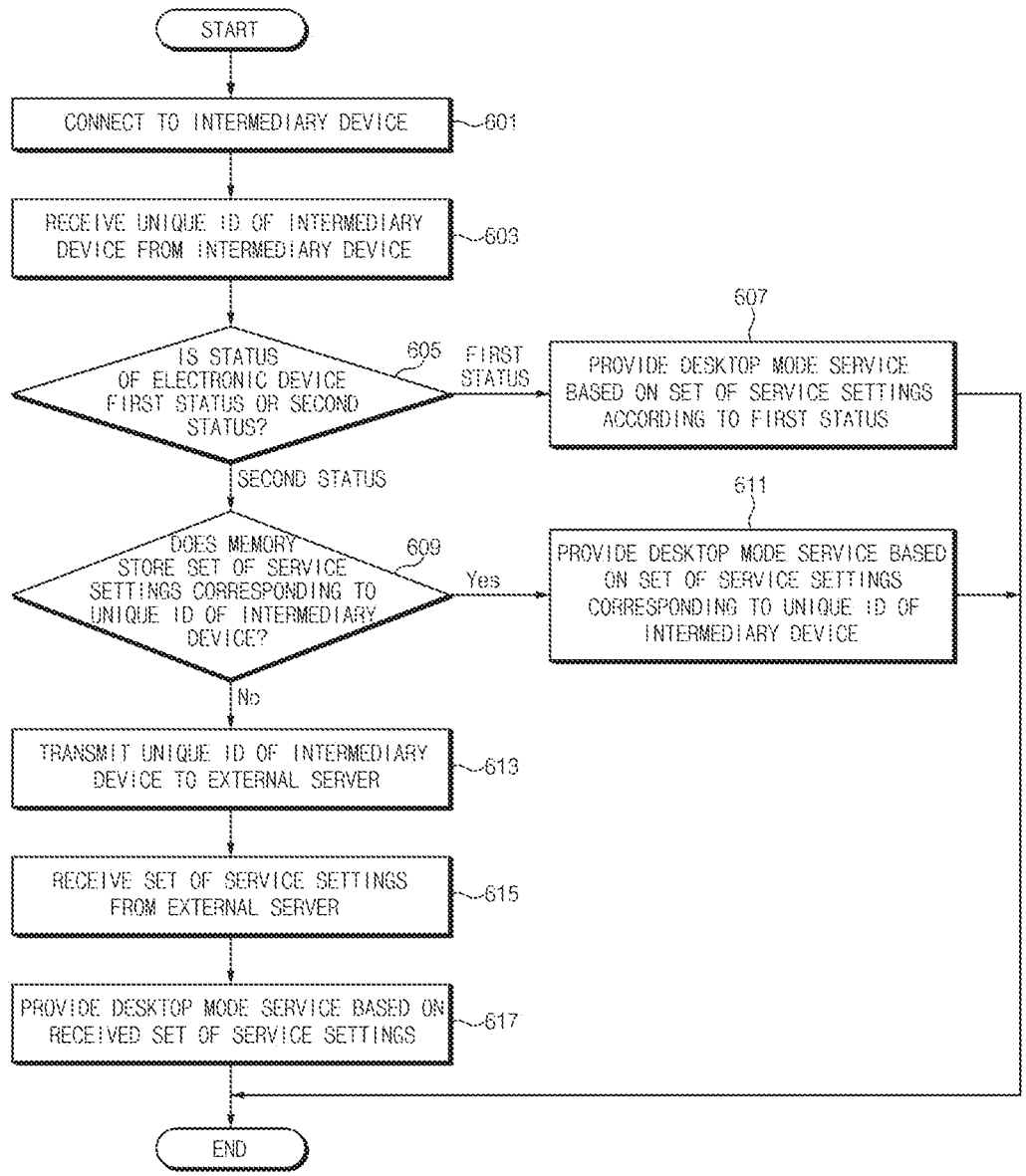
FIG. 6 is a flowchart illustrating a method for providing a desktop mode service based on a set of service settings in an electronic device according to an embodiment.

FIG. 6 is a flowchart illustrating a method for providing a desktop mode service based on a set of service settings in an electronic device according to an embodiment.

In operation 601, the electronic device may be connected to an intermediary device through the electrical connector 320.

In operation 603, the processor 350 may receive an ID of the intermediary device from the intermediary device. According to an embodiment, the ID of the intermediary device may be a MAC address of the intermediary device or a unique ID assigned to the intermediary device. A detailed process for the processor 350 to receive the ID of the intermediary device will be described below.

In operation 605, the processor 350 may determine whether a status of the electronic device 300 is a first status or a second status. According to an embodiment, the first status may be a status in which the electronic device 300 has executed an MDM mode. According to an embodiment, when the MDM mode is executed, the security of the electronic device 300 may be enhanced. For example, Wi-Fi communication of the electronic device 300 may be limited or driving of a camera module of the electronic device 300 may be limited. According to an embodiment, the second status may be a status in which the electronic device 300 has not executed the MDM mode.

When the status of the electronic device 300 is the first status, in operation 607, the processor 350 may provide a desktop mode service based on a set of service settings according to the first status. According to an embodiment, the desktop mode service may include providing data associated with a screen including a plurality of icons for application programs that are allowed for execution according to a set of service settings to an external display device through an intermediary device.

For example, the processor 350 may provide the desktop mode service based on a set of service settings used when the MDM mode is executed.

According to an embodiment, the electronic device may store a plurality of sets of service settings used when the MDM mode is executed, each service setting set including an ID of an intermediary device. The processor 350 may provide the desktop mode service based on the set of service settings corresponding to the ID of the intermediary device among the plurality of sets of service settings.

When the status of the electronic device 300 is the second status, in operation 609, the processor 350 may determine whether the memory 340 stores a set of service settings corresponding to a unique ID of the intermediary device.

When the memory 340 of the electronic device 300 stores the set of service settings corresponding to the unique ID of the intermediary device, in operation 611, the processor 350 may provide a desktop mode service based on the set of service settings corresponding to the unique ID of the intermediary device.

When the memory 340 of the electronic device 300 does not store the set of service settings corresponding to the unique ID of the intermediary device, in operation 613, the processor 350 may transmit the unique ID of the intermediary device to an external server through the wireless communication circuit 330.

In operation 615, the processor 350 may receive a set of service settings from the external server through the wireless communication circuit 330.

In operation 617, the processor 350 may provide the desktop mode service based on the received set of service settings.

Figure 7:
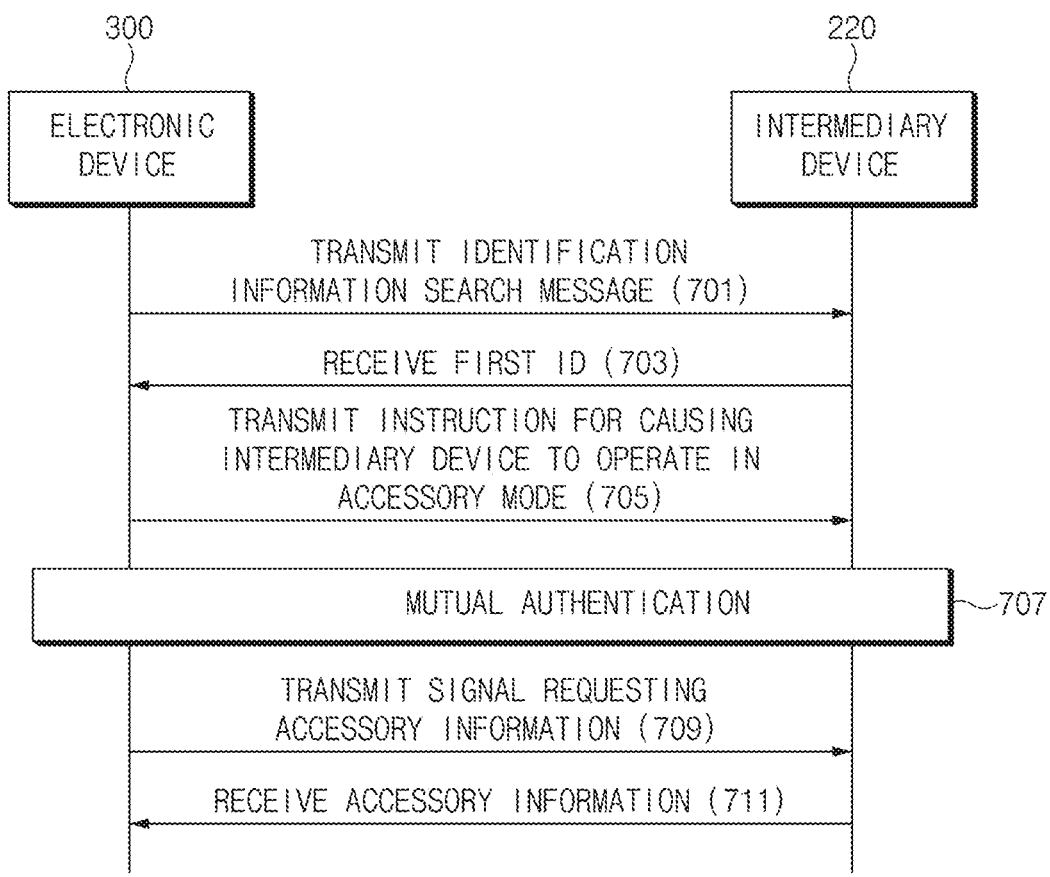
FIG. 7 is a flowchart illustrating a process for receiving a unique ID of an intermediary device when an electronic device is connected to an intermediary device.

FIG. 7 is a flowchart illustrating a process for receiving a unique ID of an intermediary device when an electronic device (e.g., the electronic device 300 of FIG. 3) is connected to an intermediary device (e.g., the intermediary device 220 of FIG. 2).

In operation 701, the processor 350 may transmit a discover identity message to the intermediary device 220 via the electrical connector 320.

In operation 703, the processor 350 may receive a first ID from the intermediary device 220 via the electrical connector 320. In one embodiment, the first ID may include a standard. ID (SVID). In one embodiment, the SVID may be an identifier of a mode supported by the intermediary device 220. For example, when the intermediary device 220 supports a display mode and an accessory mode, there may be two SVIDs (e.g., SVID1=0xFFO1 (display mode) and SVID2=Ox04E8 (accessory mode)).

According to an embodiment, the first ID may further include a vendor ID or a product ID.

In operation 705, the processor 350 may transmit an instruction for causing the intermediary device 220 to operate in the accessory mode based on the received first ID to the intermediary device 220 through the electrical connector 320. For example, when the processor 350 receives an SVID supporting the accessory mode in operation 703, the processor 350 may transmit an instruction for causing the intermediary device 220 to operate in the accessory mode to the intermediary device 220.

In operation 707, the processor 350 of the electronic device 300 and the intermediary device 220 may perform mutual authentication.

In operation 709, the processor 350 may transmit a signal for requesting accessory information of the intermediary device 220 to the intermediary device 220 via the electrical connector 320.

In operation 71 the processor 350 may receive accessory information of the intermediary device 220 from the intermediary device 220. According to an embodiment, the accessory information of the intermediary device 220 may include a second ID, a product group, a production site, a product type, or whether a product is a genuine product. According to an embodiment, the second ID may include at least one of a unique ID of the intermediary device 220 (e.g., serial number, unique number or MAC address), a provider, and an ID related to settings associated with a service or a screen to be rendered. According to an embodiment, the second ID may be a different type of ID from the first ID. According to an embodiment, the accessory information may be received as a part of unstructured vendor defined message (UVDM) data defined in the USB Type C standard.

According to an embodiment, some of the aforementioned operations 701 to 711 may be omitted. For example, when the electronic device 300 is connected to the intermediary device 220, only operations 703 and 711 may be performed. When the electronic device 300 receives only the first ID without receiving the second ID from the intermediary device 220, the processor 350 of the electronic device 300 may provide the desktop mode service based on the first ID. For example, in operation 703, the processor 350 may receive one SVID indicating a display mode. In this case, the intermediary device 220 operates in the display mode and therefore, the processor 350 may not receive the unique ID of the intermediary device 220. In an embodiment, the processor 350 may provide a non-restrictive desktop mode service through the intermediary device 220 without using a set of service settings.

According to an embodiment, the processor 350 may perform only some of operations 601 to 617 described with reference to FIG. 6. A description will be given with reference to FIGS. 8 to 11 as follows.

Figure 8:
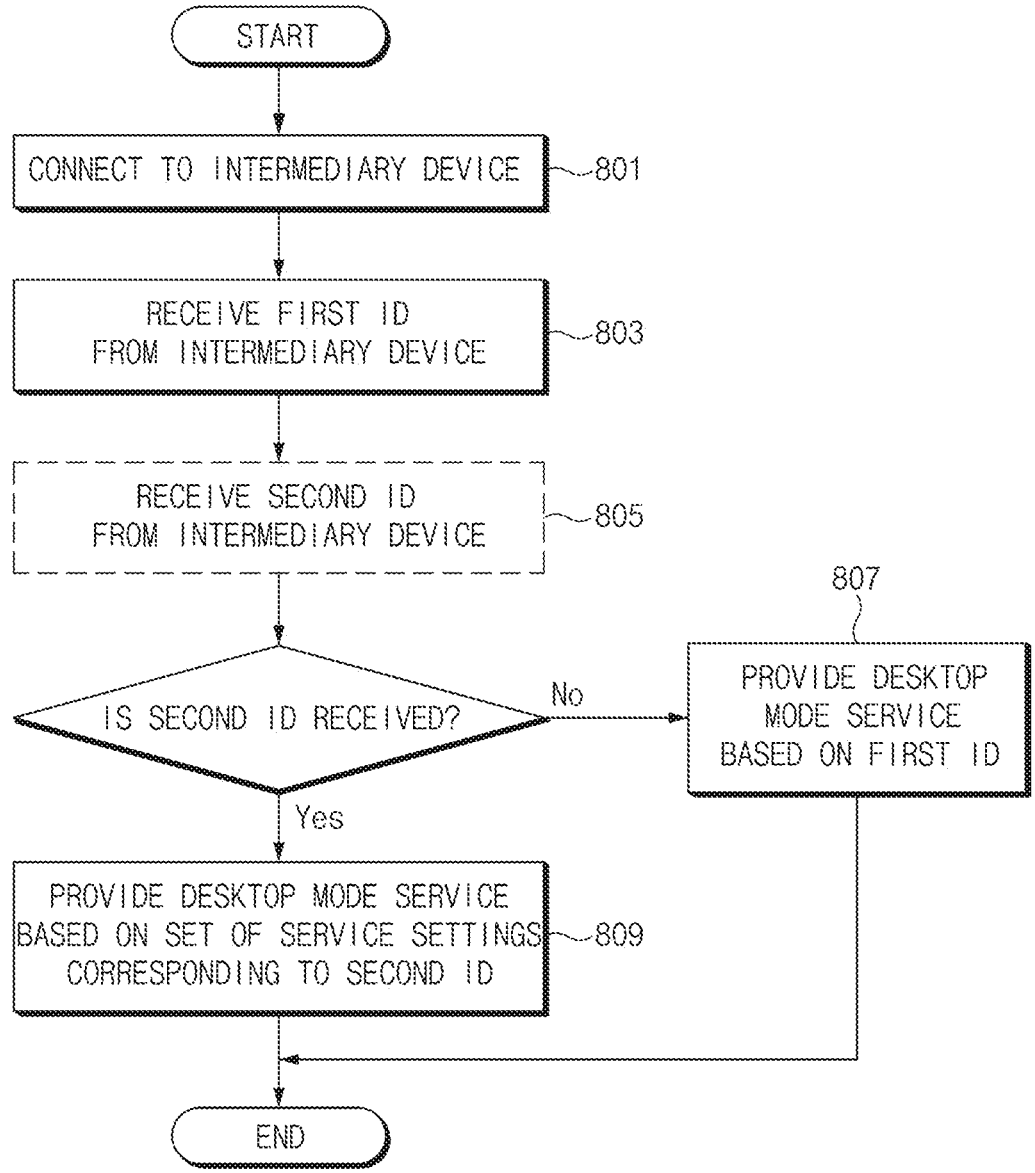
FIG. 8 is a flowchart illustrating a method for providing, by an electronic device, a desktop mode service based on a set of service settings stored in the electronic device according to an embodiment.

FIG. 8 is a flowchart illustrating a method for providing, by an electronic device, a desktop mode service based on a set of service settings stored in the electronic device (e.g., the memory 340 of FIG. 3) according to an embodiment.

In operation 801, an electronic device (e.g., the electronic device 300 of FIG. 3) may be connected to an intermediary device (e.g., the intermediary device 220 of FIG. 2) via the electrical connector 320. For example, operation 801 may correspond to operation 601 described above.

In operation 803, the processor 350 may receive a first ID from the intermediary device. In one embodiment, the first ID may include an SVID. The SVID may be an identifier of a mode supported by the intermediary device. For example, operation 803 may correspond to operation 703 described above.

In operation 805, the processor 350 may receive a second ID from the intermediary device. For example, when the intermediary device 220 supports a display mode and an accessory mode, the processor 350 may receive a second ID from the intermediary device.

In one embodiment, the second ID may include a unique ID of the intermediary device. According to an embodiment, the second ID may be a different type of ID from the first ID. For example, operation 805 may correspond to operation 711 described above.

According to an embodiment, the processor 350 may not receive the second ID from the intermediary device. For example, when the processor 350 receives only an identifier supporting the display mode from the intermediary device in operation 803, the processor 350 may not receive the second ID.

When the processor 350 does not receive the second ID in operation 803, in operation 807, the processor 350 may provide a desktop mode service based on the first ID. For example, the processor 350 may provide the desktop mode service according to default settings based on the first ID. In this case, the processor 350 may render a screen including a plurality of icons for all application programs on the memory 340 that are serviceable in a desktop mode. The processor 350 may provide data associated with the rendered screen to an external display device through the intermediary device.

In operation 803, when the processor 350 receives the second ID, in operation 809, the processor 350 may provide the desktop mode service based at least in part on the received second ID. For example, the processor 350 may provide a desktop mode service based on a set of service settings corresponding to a unique ID of the intermediary device included in the received second ID among a plurality of sets of service settings stored in the memory 340. For example, operation 809 may correspond to operation 617 described above.

Hereinafter, embodiments of a desktop mode service which an electronic device provides based on a set of service settings stored in the electronic device (e.g., in the memory 340 of FIG. 3) when the electronic device is connected to each of first to fourth intermediary devices will be described with reference to FIGS. 9A to 9C.

Figure 9A:
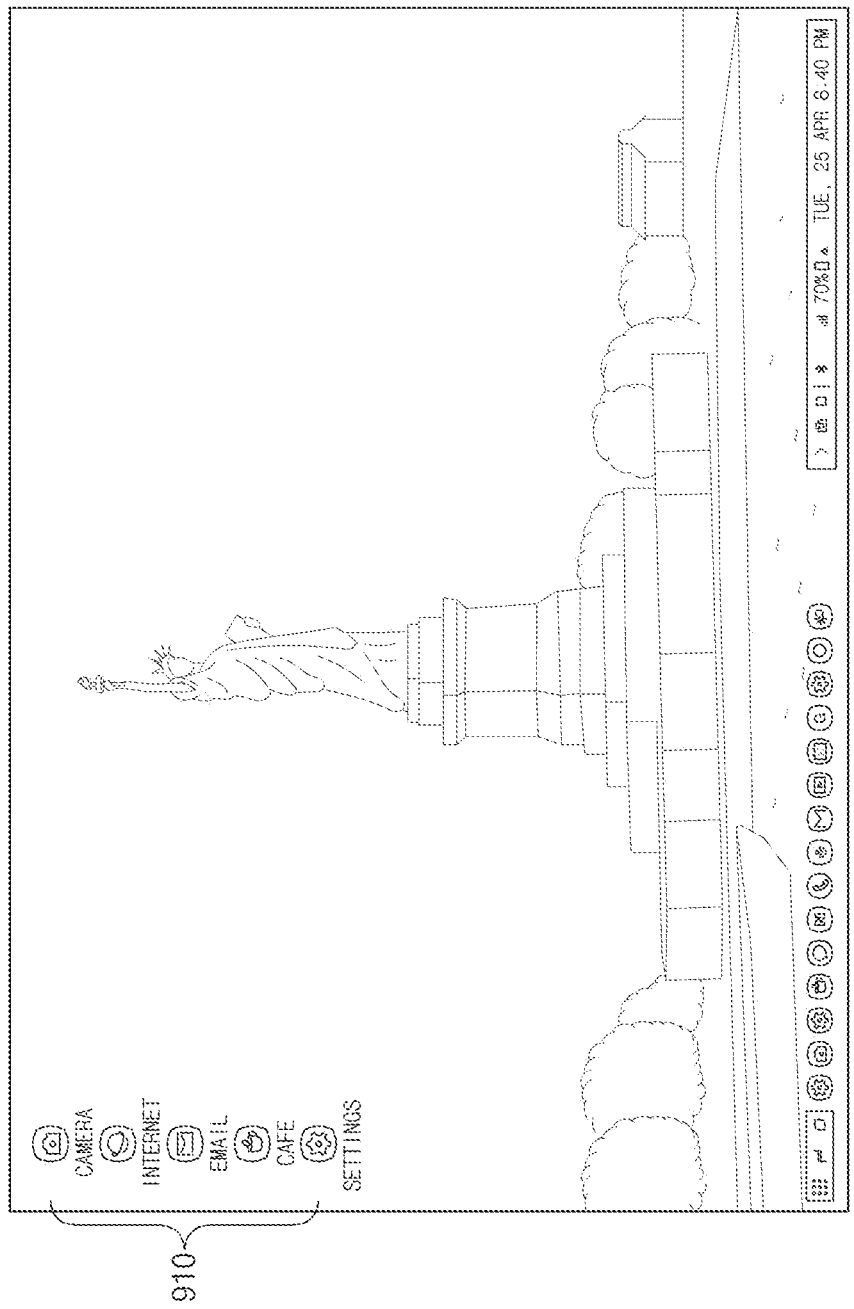
FIG. 9A is a diagram illustrating a screen displayed on an external display device when an electronic device is connected to a first intermediary device, according to an embodiment.

FIG. 9A is a diagram illustrating a screen displayed on an external display device when an electronic device is connected to a first intermediary device, according to an embodiment. FIG. 9B is a diagram illustrating a screen displayed on an external display device when an electronic device is connected to a second intermediary device, according to an embodiment. FIG. 9C is a diagram illustrating a screen displayed on an external display device when an electronic device is connected to a third intermediary device, according to an embodiment. FIG. 9D is a diagram illustrating a screen displayed on an external display device when an electronic device is connected to a fourth intermediary device or a fifth intermediary device, according to an embodiment.

In FIGS. 9A to 9D, it is assumed that an unique ID of the first intermediary device is 01, an unique ID of the second intermediary device is 02, an unique ID of the third intermediary device is 03, an unique ID of the fourth intermediary device is 04, and an unique ID of the fifth intermediary device is 05. According to an embodiment, the first intermediary device may support only a display mode and transmit only an identifier supporting the display mode as the first ID to the electronic device.

In FIGS. 9A to 9D, the memory 340 of the electronic device 300 may store an internet browser application program, a camera application program, an email application program, and a coffee ordering application program. The memory 340 may include first to fourth sets of service settings. The first set of service settings may include 02 that is a unique ID of an intermediary device, and may include a setting value for not allowing execution of the camera application program and a setting value for deactivating a Wi-Fi communication scheme. The second set of service settings may include 03 that is a unique ID of an intermediary device, and may include a predetermined home screen setting value, an automatic Wi-Fi connection setting value, and an internet browser home page setting value. The third set of service settings may include 04 and 05 that are unique IDs of intermediary devices, and may include an automatic execution application program setting value for automatically executing a coffee ordering application program, a pre-specified home screen setting value and an automatic Wi-Fi connection setting value.

Referring to FIGS. 8 and 9A, when the electronic device 300 is connected to the first intermediary device (operation 801), the processor 350 may receive a first ID of a first intermediary device by performing operation 803 described above. The first intermediary device may support only the display mode and therefore, the processor 350 does not receive a second D. The processor 350 may render a screen including a plurality of icons (910 of FIG. 9A) for all application programs stored in the memory 340 based on the first ID according to default settings. The processor 350 may provide data associated with the rendered screen to an external display device through the intermediary device.

Figure 9B:
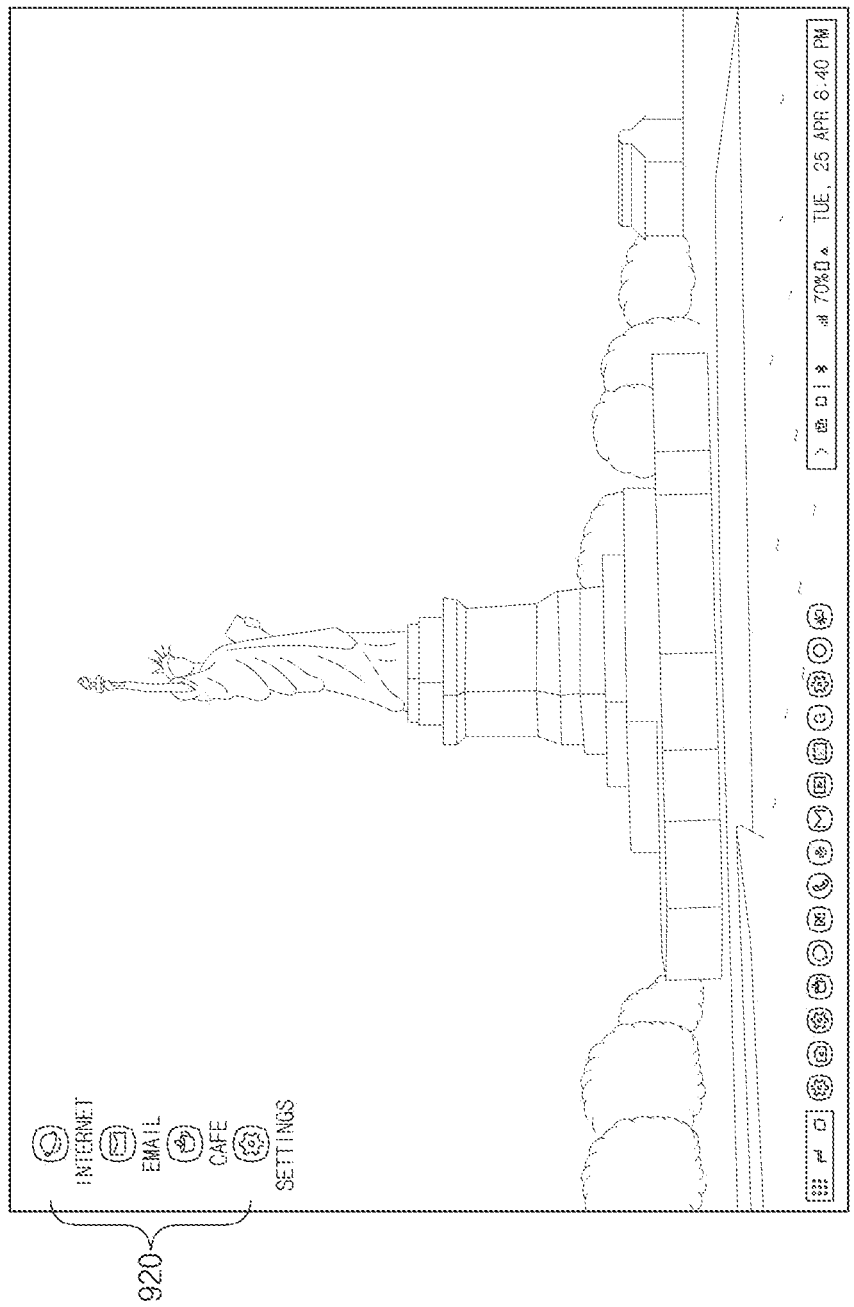
FIG. 9B is a diagram illustrating a screen displayed on an external display device when an electronic device is connected to a second intermediary device, according to an embodiment.

Referring to FIGS. 8 and 9B, when the electronic device 300 is connected to a second intermediary device (operation 801), the processor 350 may receive a first ID of the second intermediary device in operation 803, and receive 02 (second ID) that is a unique ID of the second intermediary device in operation 805. The processor 350 may provide a desktop mode service based on a first set of service settings corresponding to the unique ID 02. The processor 350 may deactivate a Wi-Fi communication module and render a screen including a plurality of icons 920 for an internet browser application program, an email application program, and a coffee ordering application program except a camera application program, as shown in FIG. 9B. The processor 350 may provide data associated with the rendered screen to an external display device through the intermediary device.

Figure 9C:
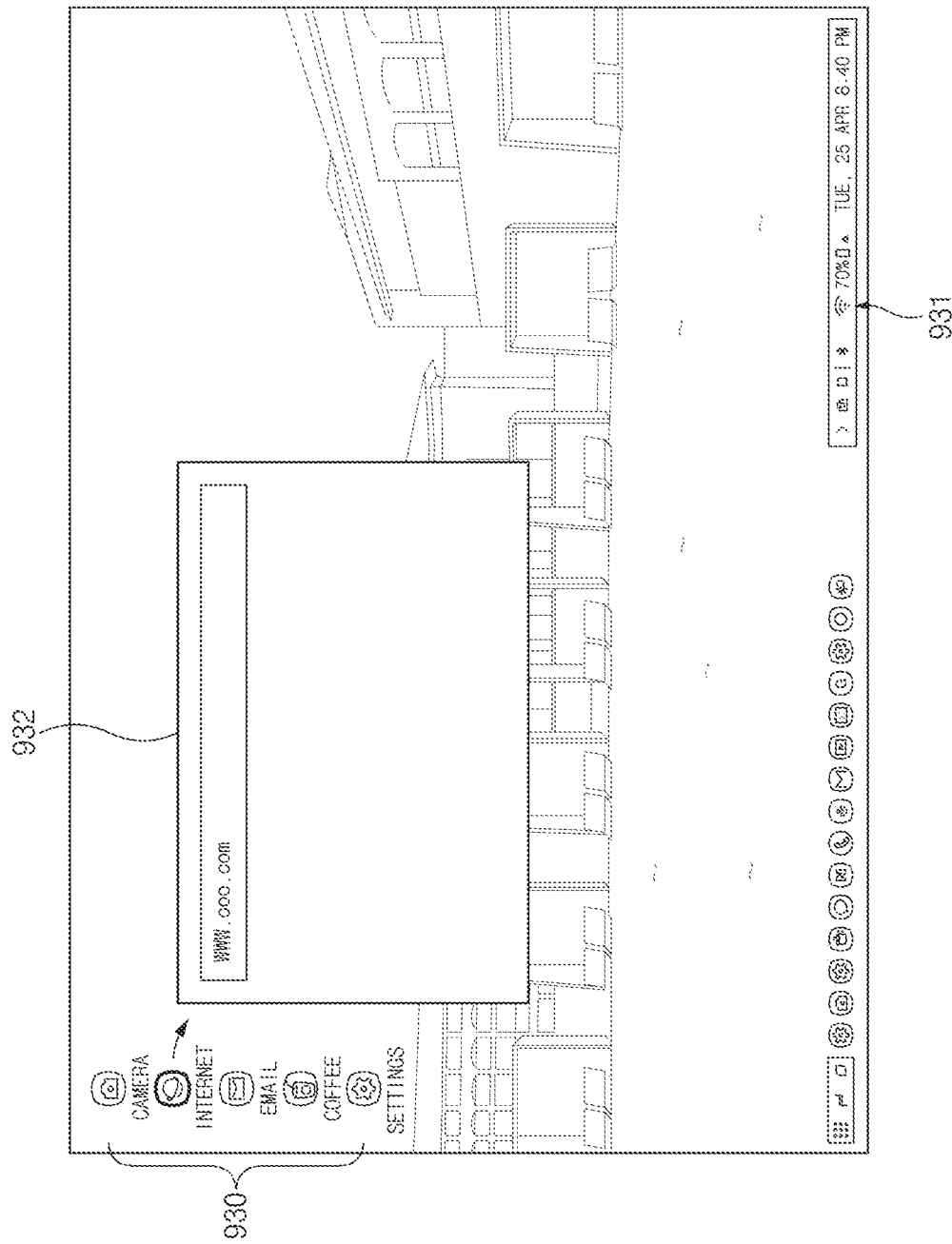
FIG. 9C is a diagram illustrating a screen displayed on an external display device when an electronic device is connected to a third intermediary device, according to an embodiment.
Figure 9D:
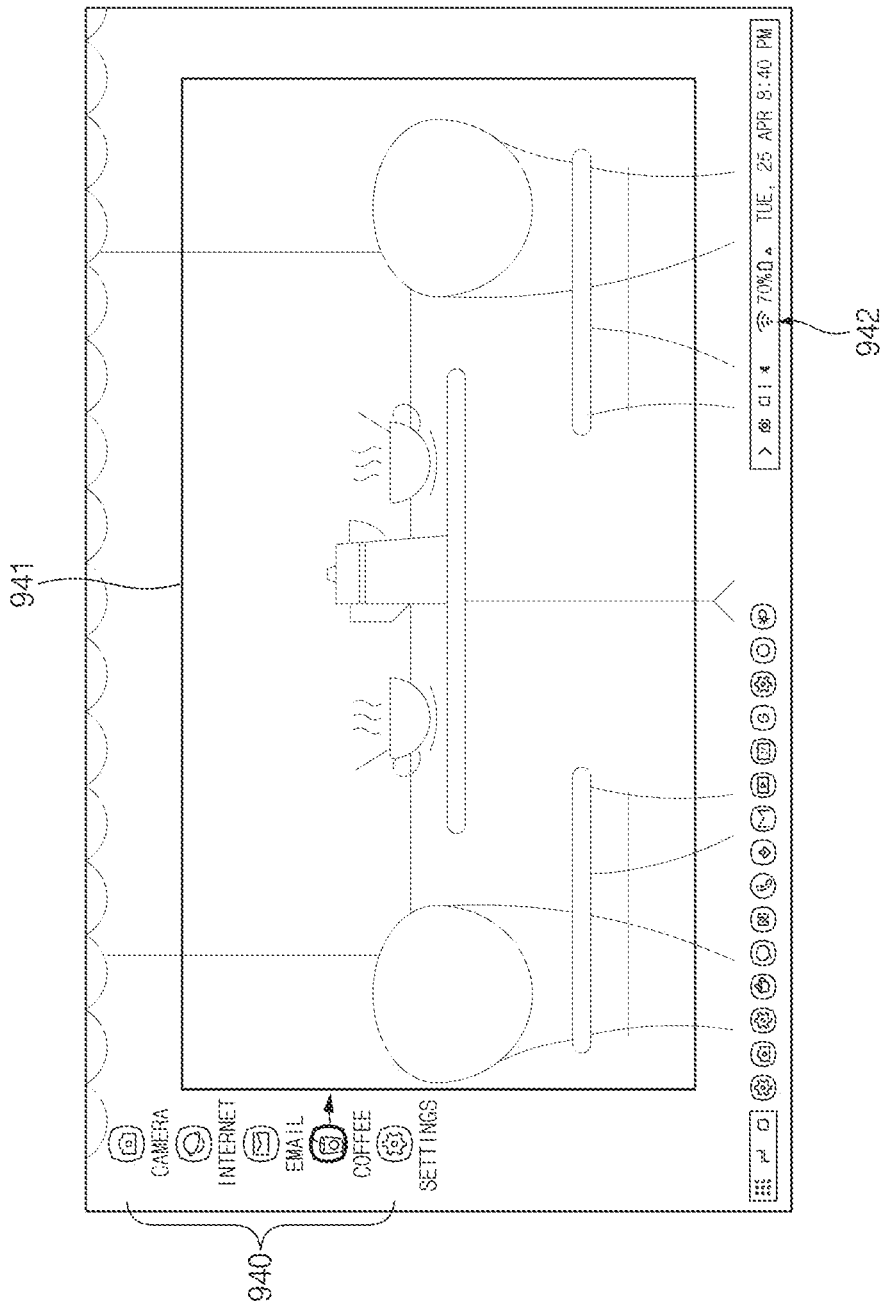
FIG. 9D is a diagram illustrating a screen displayed on an external display device when an electronic device is connected to a fourth intermediary device or a fifth intermediary device, according to an embodiment.

Referring to FIGS. 8 and 9C, when the electronic device 300 is connected to a third intermediary device (operation 801), the processor 350 may receive a first ID in operation 803, and receive 03 (second ID) that is a unique ID of the third intermediary device in operation 805. The processor 350 may provide a desktop mode service based on a second set of service settings corresponding to the unique ID 03. The processor 350 may render a screen including a plurality of icons 930 for all application programs on a home screen specified as shown in FIG. 9C based on a pre-specified home screen setting value. The processor 350 may provide data associated with the rendered screen to an external display device through the intermediary device. The processor 350 may automatically connect to an AP through a wireless communication module by using an SSID and a password included in the automatic Wi-Fi connection setting value. When an internet browser application is executed, the processor 350 may open a web page included in an internet browser-homepage setting value.

Referring to FIGS. 8 and 9D, when the electronic device 300 is connected to a fourth intermediary device (operation 801), the processor 350 may receive a first ID in operation 803, and receive 04 (second ID) that is a unique ID of the fourth intermediary device in operation 805. The processor 350 may provide a desktop mode service based on a third set of service settings corresponding to the unique ID 03. The processor 350 may automatically execute a coffee ordering application as shown in FIG. 9D based on an automatic execution application program setting value. In addition, the processor 350 may render a screen including a plurality of icons 940 for all application programs on a home screen specified based on a pre-specified home screen setting value. The processor 350 may provide data associated with the rendered screen to an external display device through the intermediary device. The processor 350 may automatically connect to an AP through a wireless communication module by using an SSID and a password included in the automatic Wi-Fi connection setting value.

Referring to FIGS. 8 and 9D, when the electronic device 300 is connected to a fifth intermediary device (operation 801), the processor 350 may receive a first ID in operation 803 and receive 05 that is a unique ID (second ID) of the fifth intermediary device in operation 805. The processor 350 may provide a desktop mode service based on a fourth set of service settings corresponding to the unique ID 05. In other words, the processor 350 may provide the same desktop mode service as in the case where the fourth intermediary device is connected to the electronic device.

As in the examples described above, the electronic device may provide another desktop mode service according to a connected intermediary device.

Figure 10:
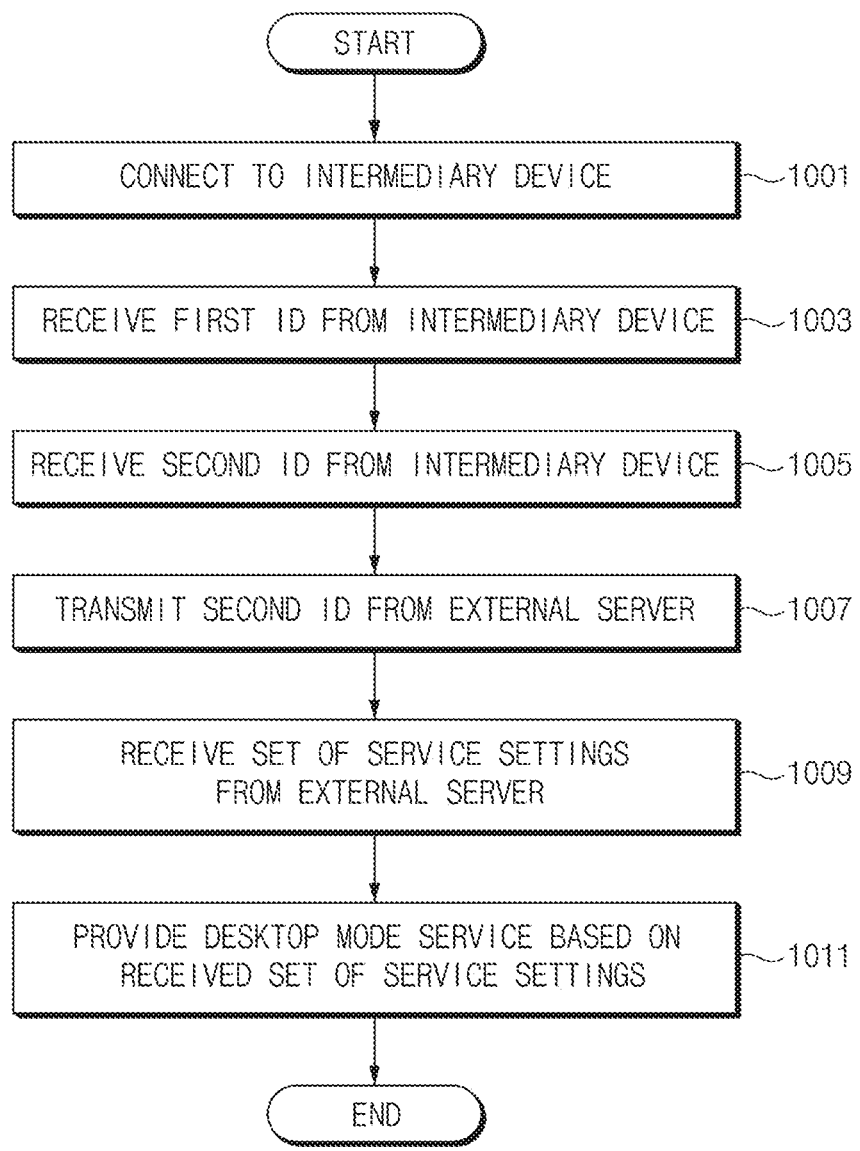
FIG. 10 is a flowchart illustrating a method for providing, by an electronic device, providing a desktop mode service based on a set of service settings stored in a server according to an embodiment.
Figure 11:
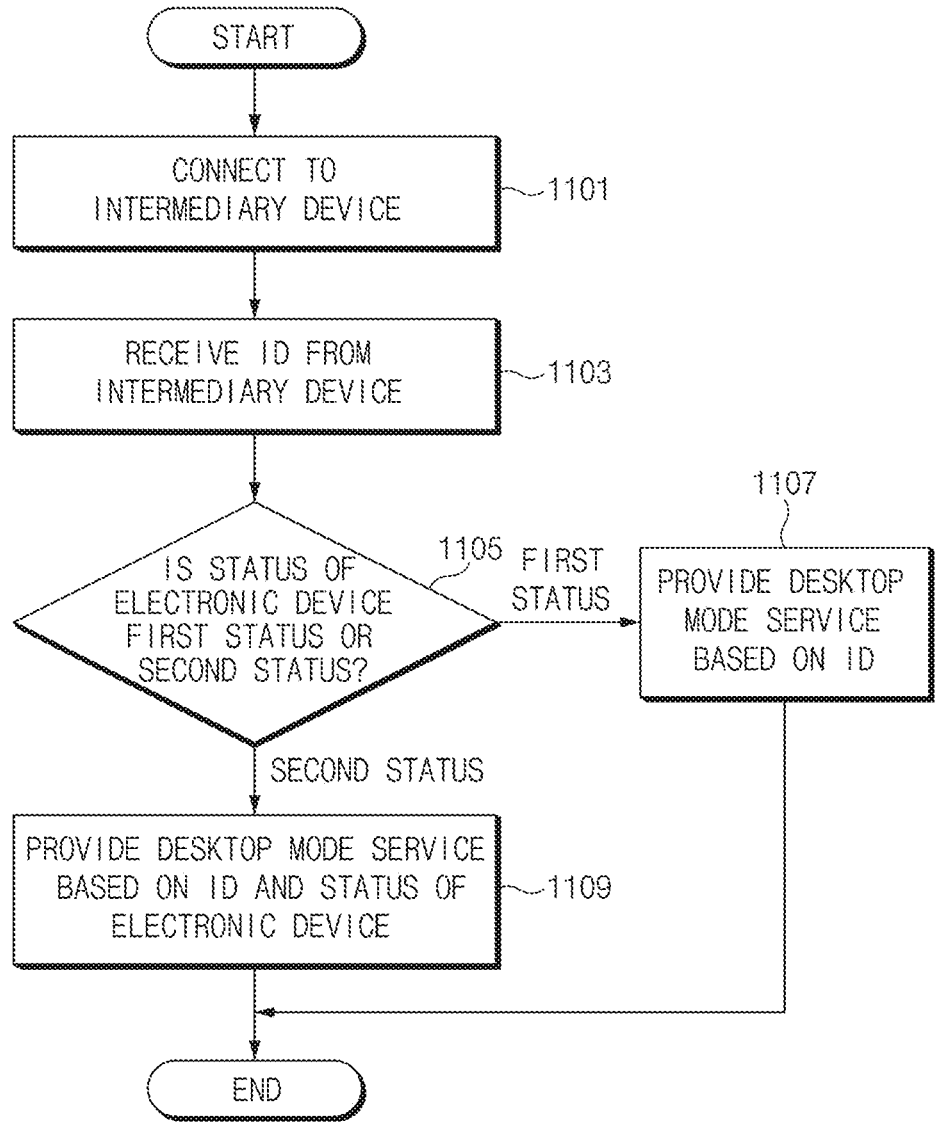
FIG. 11 is a flowchart illustrating a method for providing a desktop mode service based on a set of service settings according to a status of an electronic device according to an embodiment.

FIG. 10 is a flowchart illustrating a method for providing, by an electronic device, providing a desktop mode service based on a set of service settings stored in a server according to an embodiment.

In operation 1001, an electronic device may be connected to an intermediary device via the electrical connector 320. For example, operation 1001 may correspond to operation 601 described above.

In operation 1003, the processor 350 may receive a first ID from the intermediary device. In one embodiment, the first ID may include an SVID. The SVID may be an identifier of a mode supported by the intermediary device. For example, operation 1003 may correspond to operation 703 described above.

In operation 1005, the processor 350 may receive a second ID from the intermediary device. In one embodiment, the second ID may include a unique ID of the intermediary device, or the like. For example, operation 1005 may correspond to operation 711 described above.

In operation 1007, the processor 350 may transmit a second ID to an external server through the wireless communication circuit 330. For example, operation 1007 may correspond to operation 613 described above. According to various embodiments, when a set of service settings corresponding to the received second ID is not stored in the memory 340 of the electronic device 300, the processor 350 may perform operation 1007.

In operation 1009, the processor 350 may receive a set of service settings from an external server through the wireless communication circuit 330. According to an embodiment, the processor 350 may receive a file for a set of service settings from the external server. According to an embodiment, the file for the set of service settings may be implemented in any one format of JSON, XML, PHP, or HTML. For example, operation 1009 may correspond to operation 615 described above.

In operation 1011, the processor 350 may provide a desktop mode service based on the received set of service settings. For example, operation 1011 may correspond to operation 617 described above.

Even when the electronic device 300 receives the set of service settings from a server, the electronic device 300 may provide a desktop mode service as in the embodiment described with reference to FIGS. 9A to 9D, FIG. 11 is a flowchart illustrating a method for providing a desktop mode service based on a set of service settings according to a status of the electronic device 300 according to an embodiment.

In operation 1101, the electronic device may be connected to an intermediary device via the electrical connector 320. For example, operation 1101 may correspond to operation 601 described above.

In operation 1103, the processor 350 may receive an ID of the intermediary device from the intermediary device. For example, operation 1103 may correspond to operation 603 described above.

In operation 1105, the processor 350 may determine whether the status of the electronic device 300 is a first status or a second status. According to an embodiment, the second status may be a status in which the electronic device 300 has performed an MDM mode. According to an embodiment, when the MDM mode is executed, the security of the electronic device 300 may be enhanced. For example, operation 1105 may correspond to operation 605 described above.

When the status of the electronic device 300 is the first status, in operation 1107, the processor 350 may provide a desktop mode service based on a set of service settings according to a unique ID of the intermediary device. For example, operation 1107 may correspond to operation 617 described above. According to an embodiment, the processor 350 may provide a desktop mode service based on a set of service settings corresponding to the received ID of the intermediary device among a plurality of sets of service settings stored in the memory 340.

In operation 1109, the processor 350 may provide a desktop mode service based on a set of service settings corresponding to the unique ID of the intermediary device and the status of the electronic device 300. For example, operation 1109 may correspond to operation 607 described above.

For example, the electronic device may be in a state in which the MDM mode has been executed, and the processor 350 may provide the desktop mode service based on a set of service settings used when the MDM mode is executed. For example, Wi-Fi communication of the electronic device 300 may be restricted, and execution of a pre-specified application program may be restricted. In addition, when a file is generated in a state in which the MDM mode has been executed, the processor 350 may store the generated file in a secure area that is distinct from a general area of the memory 340. According to an embodiment, the processor 350 may render a screen including a plurality of icons for application programs stored in a secure area of the memory 340. The processor 350 may provide data associated with the rendered screen to an external display device through the intermediary device.

According to various embodiments, the electronic device 300 may provide a desktop mode service based on location information.

According to an embodiment, the set of service settings may include location information.

According to an embodiment, when the electronic device 300 is connected to an intermediary device, the processor 350 may obtain location information of the electronic device 300 through a location module. According to various embodiments, the processor 350 may receive location information from an intermediary device.

According to an embodiment, the processor 350 may provide a desktop mode service based on a set of service settings corresponding to the obtained location information. For example, when location information indicating that the electronic device 300 is located in a cafe is received, the processor 350 may provide a desktop service mode based on a set of service settings corresponding to the cafe. For example, the set of service settings may include an automatic Wi-Fi setting value, and the processor 350 may automatically connect to an AP using the automatic Wi-Fi setting value.

According to various embodiments, when the electronic device 300 is located at a place indicated by location information included in the set of service settings, the processor 350 may use a setting value included in the set of service settings even when the electronic device 300 is separated from the intermediary device. For example, when the processor 350 automatically connect to the AP based on the set of service settings corresponding to the cafe and the electronic device 300 is located in the cafe even though the electronic device 300 is separated from the intermediary device, the processor 350 may continuously use the automatic Wi-Fi setting value. According to various embodiments, when the electronic device 300 moves out of the cafe, the processor 350 may not provide a service based on the set of service settings. For example, the processor 350 may no longer use the Wi-Fi setting value included in the set of service settings, and release the Wi-Fi connection.

According to an embodiment disclosed herein, an electronic device (e.g., the electronic device 300 of FIG. 3) may include a housing (e.g., the housing h210 of FIG. 2), a touch screen display (e.g., the touch screen display 310 of FIG. 3) exposed through the housing, an electrical connector (e.g., the electrical connector 320 of FIG. 3) exposed through the housing, a wireless communication circuit (e.g., the wireless communication circuit 330 of FIG. 3), a processor (e.g., the processor 350 of FIG. 3) operatively connected to the display, the electrical connector and the communication circuit, and a memory (e.g., the memory 340 of FIG. 3) operatively connected to the processor, wherein the memory stores instructions which when executed, cause the processor to, in a first operation when the electronic device is connected to a first external accessory device via the electrical connector, receive at least one first identification (ID) from the first external accessory device via the electrical connector, render a first screen including a first plurality of icons for application programs on the memory, and provide data associated with the first screen to an external display through the first external accessory device via the electrical connector and in a second operation when the electronic device is connected to a second external accessory device via the electrical connector, receive at least one second ID from the second external accessory device via the electrical connector, the second ID being of the same type as the first ID, receive at least one third ID from the second external accessory device via the electrical connector, the third ID being different from the first ID, render a second screen including a second plurality of icons for the application programs on the memory based at least in part on the third ID, and provide data associated with the second screen to the external display device through the second external accessory device via the electrical connector.

According to an embodiment, the memory may include a plurality of sets of service settings, wherein each of the plurality of sets of service settings may include the third ID, and the instructions may cause the processor to render the second screen based on the set of service settings corresponding to the received third ID.

According to an embodiment, the instructions may cause the processor to set a setting value associated with operation of the electronic device based on the set of service settings corresponding to the received third ID.

According to an embodiment, the set of service settings may include at least one of a hardware activation/deactivation setting value, an automatic screen-off time setting value, a customized home screen/lock screen/background setting value, a lock type setting value, a container mode setting value in a mobile device management (MDM) state, an allowed/disallowed application setting value, or a communication setting value.

According to an embodiment, at least one of the plurality of sets of service settings may include a plurality of third IDs.

According to an embodiment, the instructions may cause the processor to receive resources for rendering the second screen through the communication circuit based at least in part on the third ID in the second operation.

According to an embodiment, the instructions may cause the processor to receive the resources for rendering the second screen through the communication circuit when the memory does not store the resources for rendering the second screen.

According to an embodiment, each of the first ID and the second ID may include at least one of a standard ID (SVID) presenting a mode of supporting an external accessory device, a vendor ID, or a product ID.

According to an embodiment, the third ID may include an ID associated with a setting associated with a provider, a service or a second screen.

According to an embodiment, the instructions may cause the processor to receive the third ID as a part of unstructured vendor defined message (UVDM) data.

Furthermore according to an embodiment disclosed herein, an electronic device may include a housing (e.g., the housing h210 of FIG. 2), a touch screen display (e.g., the touch screen display 310 of FIG. 3) exposed through the housing, an electrical connector (e.g., the electrical connector 320 of FIG. 3) exposed through the housing, a wireless communication circuit (e.g., the wireless communication circuit 330 of FIG. 3), a processor (e.g., the processor 350 of FIG. 3) operatively connected to the touch screen display, the electrical connector and the wireless communication circuit, and a memory (e.g., the memory 340 of FIG. 3) operatively connected to the processor, wherein the memory stores instructions which when executed, cause the processor to, when the electronic device is connected to the external accessory device via the electrical connector, receive at least one second ID from the external accessory device via the electrical connector, the second ID being of a different type from the first ID, transmit the second ID to an external server through the wireless communication circuit, receive a file for a set of service settings corresponding to the second ID from the external server through the wireless communication circuit, render a screen including a plurality of icons for application programs on the memory based at least in part on the received file for the set of service settings and provide data associated with the screen to an external display through the external accessory device via the electrical connector.

According to an embodiment, the file for the set of service settings may be implemented in at least one format of JSON, XML, PHP, or HTML.

According to an embodiment, the instructions may cause the processor to set a setting value associated with operation of the electronic device based in part on the received file for the set of service settings.

According to an embodiment, the file for the set of service settings may include at least one of a hardware activation/deactivation setting value, an automatic screen-off time setting value, a customized home screen/lock screen/background setting value, a lock type setting value, a container mode setting value in a mobile device management (MDM) mode, an allowed/disallowed application setting value, or a communication setting value.

According to an embodiment, the instructions may cause the processor to display a user interface for generating the file for the set of service settings corresponding to the second ID on the touch screen display when the processor receives a response indicating that the external server does not include the file for the set of service settings corresponding to the second ID from the external server through the wireless communication circuit.

In addition, according to an embodiment disclosed herein, an electronic device (e.g., the electronic device 300 of FIG. 3) may include a housing (e.g., the housing h210 of FIG. 2), a touch screen display (e.g., the touch screen display 310 of FIG. 3) exposed through the housing, an electrical connector (e.g., the electrical connector 320 of FIG. 3) exposed through the housing, a wireless communication circuit, a processor (e.g., the processor 350 of FIG. 3) operatively connected to the display, the electrical connector and the communication circuit, and a memory (e.g., the memory 340 of FIG. 3) operatively connected to the processor, wherein the memory stores instructions which when executed, cause the processor to, in a first operation when the electronic device is connected to a first external accessory device via the electrical connector, receive at least one first identification (ID) from the first external accessory device via the electrical connector, render a first screen including a first plurality of icons for application programs on the memory, and provide data associated with the first screen to the external display through the first external accessory device via the electrical connector and in a second operation when the electronic device is connected to a second external accessory device via the electrical connector, receive at least one second ID from the second external accessory device via the electrical connector, the second ID being of the same type as the first ID, determine a status of the electronic device, render a second screen including a second plurality of icons for the application programs on the memory based at least in part on the status, and provide data associated with the second screen to the external display through the second external accessory device via the electrical connector.

According to an embodiment, the status is associated with enhanced security of the electronic device.

According to an embodiment, the status is associated with mobile device management (MDM).

According to an embodiment, the memory may include a general area and a secure area and when a status of the electronic device is an MDM execution status, the instructions may cause the processor to render a second screen including a second plurality of icons for application programs stored in a secure area of the memory.

According to an embodiment, when a status of the electronic device is in the MDM execution status, the instructions may cause the processor to store a file generated through an application program stored in the secure area in the secure area of the memory.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a touch screen display exposed through the housing;
an electrical connector exposed through the housing;
a wireless communication circuit;
a processor operatively connected to the display, the electrical connector and the communication circuit; and
a memory operatively connected to the processor,
wherein the memory stores instructions which when executed, cause the processor to:
in a first operation when the electronic device is connected to a first external accessory device via the electrical connector,
receive at least one first identification (ID) from the first external accessory device via the electrical connector,
render a first screen including a first plurality of icons for application programs on the memory based at least in part on the first ID, and
provide data associated with the first screen to an external display through the first external accessory device via the electrical connector,
in a second operation when the electronic device is connected to a second external accessory device via the electrical connector,
receive at least one second ID from the second external accessory device via the electrical connector, the second ID being of a same type as the first ID,
receive at least one third ID from the second external accessory device via the electrical connector, the third ID being of a different type from the first ID, render a second screen including a second plurality of icons for the application programs on the memory based at least in part on the third ID, and provide data associated with the second screen to the external display device through the second external accessory device via the electrical connector.

2. The electronic device of claim 1, wherein the memory includes a plurality of sets of service settings, wherein each of the plurality of sets of service settings includes the third ID, and wherein the instructions cause the processor to render the second screen based on a set of service settings corresponding to the received third ID.

3. The electronic device of claim 2, wherein the instructions cause the processor to set a setting value associated with operation of the electronic device based on based on the set of service settings corresponding to the received third ID.

4. The electronic device of claim 2, wherein the set of service settings includes at least one of a hardware activation/deactivation setting value, an automatic screen-off time setting value, a customized home screen/lock screen/background setting value, a lock type setting value, a container mode setting value in a mobile device management (MDM) state, an allowed/disallowed application setting value, or a communication setting value.

5. The electronic device of claim 2, wherein at least one of the plurality of sets of service settings includes a plurality of third IDs.

6. The electronic device of claim 1, wherein the instructions cause the processor to receive resources for rendering the second screen through the communication circuit based at least in part on the third ID in the second operation.

7. The electronic device of claim 6, wherein the instructions cause the processor to receive the resources for rendering the second screen through the communication circuit when the memory does not store the resources for rendering the second screen.

8. The electronic device of claim 1, wherein each of the first ID and the second ID includes at least one of a standard ID (SVID) presenting a mode of supporting an external accessory device, a vendor ID, or a product ID.

9. The electronic device of claim 1, wherein the third ID includes an ID associated with a setting associated with a provider, a service or the second screen.

10. The electronic device of claim 1, wherein the instructions cause the processor to receive the third ID as a part of unstructured vendor defined message (UVDM) data.

11. An electronic device comprising:
a housing;
a touch screen display exposed through the housing;
an electrical connector exposed through the housing;
a wireless communication circuit;
a processor operatively connected to the display, the electrical connector and the communication circuit; and
a memory operatively connected to the processor,
wherein the memory stores instructions which when executed, cause the processor to:
receive at least one first ID from a first external accessory device via the electrical connector in a first operation when the electronic device is connected to the first external accessory device via the electrical connector,
render a first screen including a first plurality of icons for application programs on the memory, and
provide data associated with the first screen to an external display through e first external accessory device via the electrical connector,
in a second operation when the electronic device is connected to a second external accessory device via the electrical connector,
receive at least one second ID from the second external accessory device via the electrical connector, the second ID being of the same type as the first ID,
determine a status of the electronic device,
render a second screen including a second plurality of icons for application programs on the memory based at least in part on the status, and
provide data associated with the second screen to the external display device through the second external accessory device via the electrical connector.

12. The electronic device of claim 11, wherein the status is associated with enhanced security of the electronic device.

13. The electronic device of claim 1, wherein the status is associated with mobile device management (MDM).

14. The electronic device of claim 11, wherein the memory includes a general area and a secure area, and wherein when a status of the electronic device is an MDM execution status, the instructions cause the processor to render a second screen including a second plurality of icons for application programs stored in a secure area of the memory.

15. The electronic device of claim 14, wherein, when a status of the electronic device is in the MDM execution status, and wherein the instructions cause the processor to store a file generated through the application program stored in the secure area in the secure area of the memory.

\* \* \* \* \*